Figure 7:
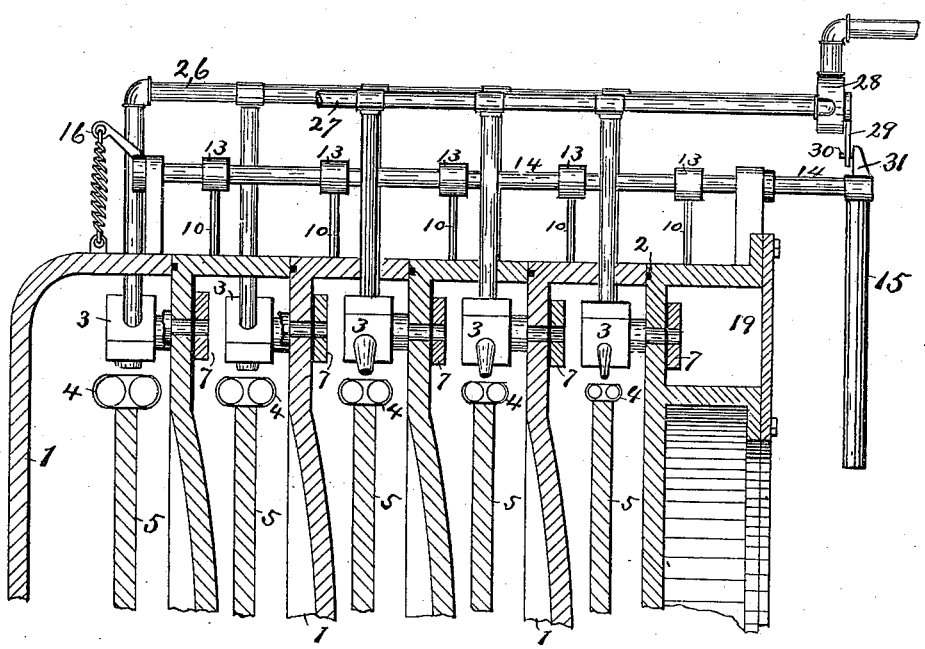

H. L. BOWDOIN.
TURBINE.
APPLICATION FILED FEB. 9, 1910.
996,698.
Patented July 4, 1911.
3 SHEETS—SHEET 1.
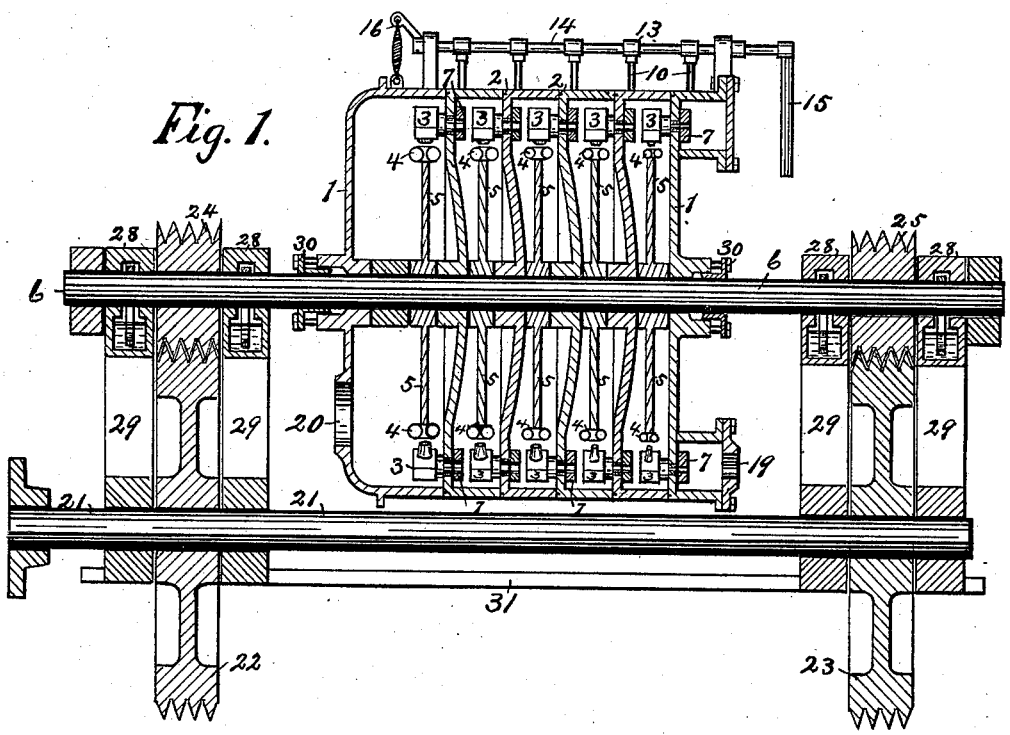
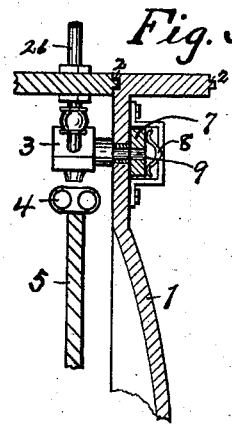
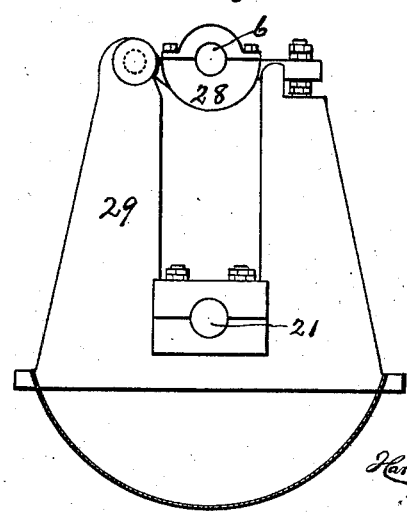
WITNESSES:
INVENTOR
Harry L. Bowdoin.

H. L. BOWDOIN.
TURBINE.
APPLICATION FILED FEB. 9, 1910.
996,698.
Patented July 4, 1911.
3 SHEETS—SHEET 2.
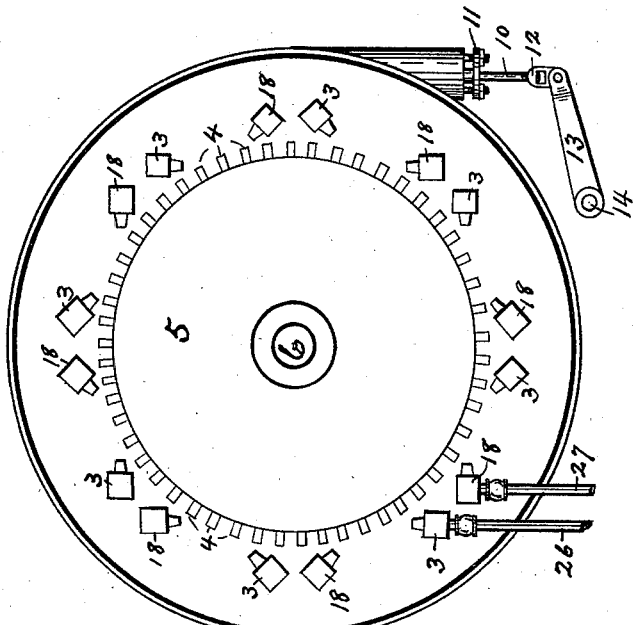
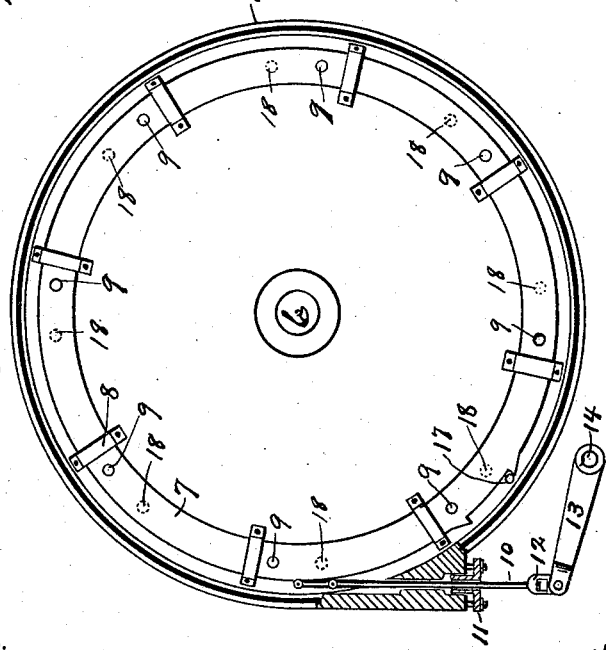
WITNESSES:
INVENTOR
Harry L. Bowdoin

H. L. BOWDOIN.
TURBINE.
APPLICATION FILED FEB. 9, 1910.

996,698.

Patented July 4, 1911.
3 SHEETS—SHEET 3.

WITNESSES:

INVENTOR

UNITED STATES PATENT OFFICE.

HARRY L. BOWDOIN, OF NEW YORK, N. Y.

TURBINE.

996,698. Specification of Letters Patent. Patented July 4, 1911.

Application filed February 9, 1910. Serial No. 542,971.

*To all whom it may concern:*

Be it known that I, HARRY L. BOWDOIN, a citizen of the United States, and a resident of New York city, in the county of New York and State of New York, have invented certain new and useful Improvements in Turbine-Engines, of which the following is a specification.

The invention relates to improvements in reversible and geared turbine engines, and consists in the novel features, arrangements and combination of parts hereinafter described, and particularly pointed out in the claims.

The object of my invention is to provide a reversible turbine engine for use in boats, automobiles and other places where light, simple, powerful and reversible engines may be needed.

Turbine engines now in use have been constructed to run in one direction only, there being no means of reversing, except by a separate turbine running in vacuum; but my invention, the reversible turbine engine, may be reversed instantly, and with the full power of the engine.

The full power and economy of a turbine engine is secured only when the engine is running at a high speed, and the object of my invention is to retain this high speed while at the same time delivering the power at a lower speed.

My invention also embraces novel constructions and arrangements of the reversing mechanism, and also other novel features, all of which will be fully understood from the detailed description hereinafter presented, reference being had to accompanying drawings, in which:

Figure 1 is a sectional view of the engine, which is of the multi-stage, bucket and nozzle, impulse type; each stage consisting of a set of nozzles and a bucket wheel with double cup buckets set in its periphery, and the whole inclosed in a sectional casing of metal. Fig. 1 also shows the friction gears and the shaft through which the power is delivered. Fig. 2 is a front view of the engine frame, showing the bearings for the shafts and means for adjusting the friction gear. Fig. 3 is an enlarged view, showing the pass over pipe and means for holding the reversing ring up to its seat. Fig. 4 is a back view of a sectional casing, showing the reversing ring and means of operating. Fig. 5 is a front view of a sectional casing, showing two sets of opposed nozzles, a bucket wheel and pass over pipes. Fig. 6 is an enlarged view of the double cupped and double sided buckets, and means of securing same to the periphery of the disks, and Fig. 7 is an enlarged view, partly in longitudinal section and partly broken away, showing a system of pass-over pipes and valve to admit steam to an entire set of nozzles when starting or reversing, two of the nozzles and part of the steam pipe being broken away in order to show the connection to each set of nozzles.

In the drawings —1— designates the shell or cylinder of the turbine, which is made up of two end castings, between which are diaphragm castings, which contain the nozzles, and divide the cylinder of the turbine into separate stages. The diaphragms are accurately centered with each other, and with the two end castings, by turned and bored, tongue and groove joints —2— and packed with fibrous packing. The nozzles —3— made of varying sizes to conform to the expansion of the steam, are screwed into a nozzle body, and set accurately in place in the diaphragm castings.

The buckets —4— are double cupped and double sided, and of sizes to conform to the nozzle openings; they are suitably mounted on the periphery of the disks —5— with a radial clearance between the buckets and nozzles. The disks are suitably mounted on a shaft —6— working in suitable bearings. The rear of the diaphragm castings are faced to receive the reversing rings —7— which are held tightly in place by the spring clamps —8—. The reversing rings have in them a number of holes —9— spaced to conform with the holes in one set of nozzles, and extensions on the rings are connected through hinged connecting rods —10— through stuffing boxes —11— to turnbuckle bearings —12— which engage rocker arms —13— mounted on a shaft —14—. The shaft —14— is operated by the handle —15— and locked by the mechanism —16—. The extreme movement of the reversing rings is controlled by the stop —17— and is the length of the space between the holes in the two sets of nozzles. The reverse nozzles —18— are set at angles directly opposed to the other nozzles, and are equally spaced. The steam enters at the flange —19— and after passing through the various nozzles and stages, exhausts at —20—.

The motion of the engine is imparted to the main driving shaft —21— by means of the friction gears —22—23— which reduces the speed of the driving shaft, while at the same time increasing the power delivered. In starting or reversing, live steam is admitted to a nozzle in each stage by means of a pass over valve and pipes —26—27—, the valve 28 being a three-way valve and operated by means of a slotted valve handle 29 engaging a pin 30 in a lug 31 on the main operating handle 15.

To operate: Steam is turned on, and passing through the holes —9— in the reversing ring into the nozzles —3— strikes the buckets —4— at high pressure, revolving the disks —5—. The steam then passes into the next compartment through the holes —9— and nozzles —3— impinging the buckets —4— and helping to revolve the disks —5— and the shaft —6—. This process is continued through the different stages until the steam is exhausted at —20—. In starting or reversing, live steam is momentarily admitted to a nozzle in each stage by means of a pass over valve and pipes. The revolving shaft —6— imparts its velocity to the pinions —24—25— which meshing into the gears —22—23— impart a lower speed to the main shaft —21— but increase the power three or four to one delivered by the engine. The bearings —28— of the engine shaft are arranged to be moved up and down in the engine frame —29— so that they may be properly adjusted to mesh with the toothed or friction gears. Steam is prevented from passing out from the diaphragm castings and shell of the engine by means of stuffing boxes —30—. The shell is fastened to the main engine frame and bed plate —31— and may be moved to correspond with the downward movement of the bearings —28—. The engine may run either condensing or noncondensing.

To reverse: The handle —15— is swung over to the limit of the stop —17— operating through the rocker arms —13— turnbuckle bearings —12— and connecting rods —10— moving the reversing rings —7— so that the holes —9— come opposite the holes in the nozzles —18—. This causes the steam to strike the buckets on the opposite side, thus reversing the movement of the disks and shaft; the operation continuing through each stage to the exhaust. By bringing the handle —15— to a perpendicular position the reversing plate —7— would cover the holes in both sets of nozzles, thus shutting off the steam and stopping the engine. The handle —15— through its mechanism, may thus be used both as a throttle and reversing lever, and also a cut off.

I claim:

1. A reversible turbine engine having a series of jets through which steam is directed into double cupped buckets, so constructed as to throw the steam back upon itself, adding the power of reaction to that of the concentrated force of the jet, said buckets being fastened to the periphery of disks which are mounted on a shaft and working freely in a casing, pass over valve and pipes, and means for directing the steam against the opposite side of said buckets for reversing.

2. In a turbine engine, disks mounted on a shaft, buckets fastened to the periphery of said disks and constructed to throw the steam back upon itself, jets placed to throw the steam directly into said buckets, pass over valves and pipes to admit live steam in starting and reversing, shell castings separating the different stages for the expansion of the steam, means for the inlet and exhaust of steam and a reversing ring covering the steam openings in both series of nozzles, but movable over same, and having one set of holes in said ring so disposed as to be moved directly over the openings in one series of nozzles to allow the engine to run one way, or to be moved opposite the openings in the other series of nozzles, cutting off the first series, to reverse the motion of the engine, or to be moved between the openings in both series of nozzles, to stop the engine.

3. In a turbine engine, having disks mounted on a shaft, double cupped, double sided buckets fastened to the periphery of said disks, a double series of nozzles directly opposed to each other, surrounding said disks and clear of said buckets, suitable shell and diaphragm castings for holding same, means for the inlet and exhaust of steam, pass over valves and pipes to assist in starting and reversing, a reversing ring having a stop and one set of holes, and operated by suitable mechanism, and pinions mounted on the turbine shaft, meshing into gears on a main shaft and all carried in one engine frame.

4. The combination of a shell made up of end and diaphragm castings, with tongue and groove joints for fibrous packing, a shaft carrying a series of disks, buckets mounted on the periphery of said disks, nozzles, centering into said buckets, but clearing same, accurately spaced and securely set into said diaphragm castings, an opposed set of nozzles accurately spaced and securely set into said diaphragm castings, means for the inlet and exhaust of steam, together with a reversing ring, having one set of holes accurately spaced to open into one set of nozzles, and mechanism for moving same from one set of nozzles to the other.

5. The combination of a shell made up of end and diaphragm castings, with packed joints, a shaft, a series of disks securely mounted thereon, buckets fastened around the outer edge of said disks, two sets of nozzles of graded sizes, each set accurately and evenly spaced around the periphery of said disks, and each set pointing in an opposing direction to the other, means for the inlet and exhaust of steam, together with reversing rings faced to fit against the diaphragm castings, spring clamps for holding said rings tightly against said diaphragm castings, stops for limiting the movement of said rings, connecting rods hinged to said rings and passing out through suitable stuffing boxes, turnbuckle bearings for adjusting said connecting rods, rocker arms mounted on a shaft and engaging said turnbuckle bearings, a spring lock mounted on said shaft to hold same in position, and a lever mounted on said shaft for operating the reversing mechanism, and to act as a throttle.

Signed at New York city, in the county of New York and State of New York this 8th day of February, 1910.

HARRY L. BOWDOIN.

Witnesses:
C. AUBREY VAUGHAN,
G. D. MOSHER.

---

Copies of this patent may be obtained for five cents each, by addressing the "Commissioner of Patents, Washington, D. C."